(12) United States Patent
Ludwig et al.

(10) Patent No.: US 8,141,940 B2
(45) Date of Patent: Mar. 27, 2012

(54) HEADLINER ASSEMBLY HAVING A REINFORCEMENT MEMBER AND SUBCOMPONENT ROUTING AID

(75) Inventors: Adam Michael Ludwig, Ann Arbor, MI (US); Jeff Charles Hills, Grand Rapids, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 59 days.

(21) Appl. No.: 12/628,685

(22) Filed: Dec. 1, 2009

(65) Prior Publication Data

US 2011/0127805 A1 Jun. 2, 2011

(51) Int. Cl.
*B60R 13/02* (2006.01)

(52) U.S. Cl. ...................................... 296/214; 296/1.08

(58) Field of Classification Search ................. 296/1.08, 296/214, 1.02, 216.06, 216.07, 97.9

See application file for complete search history.

(56) References Cited

U.S. PATENT DOCUMENTS

| | | | |
|---|---|---|---|
| 5,833,304 A | 11/1998 | Daniel et al. | |
| 5,845,458 A | 12/1998 | Patel | |
| 6,086,145 A * | 7/2000 | Wandyez | 296/214 |
| 6,652,021 B1 * | 11/2003 | Dykman et al. | 296/214 |
| 6,733,064 B2 * | 5/2004 | Fox et al. | 296/68.1 |
| 7,182,908 B2 | 2/2007 | Preisler et al. | |
| 7,746,535 B2 * | 6/2010 | Kelley et al. | 359/267 |
| 2003/0230044 A1 * | 12/2003 | Peterson | 52/716.5 |
| 2007/0046073 A1 * | 3/2007 | Ludwig et al. | 296/214 |

FOREIGN PATENT DOCUMENTS

JP 40527852 A * 10/1993 ................ 296/214

* cited by examiner

*Primary Examiner* — Jason S Morrow
(74) *Attorney, Agent, or Firm* — Gifford, Krass, Sprinkle, Anderson & Citkowski, P.C.

(57) ABSTRACT

A headliner assembly for covering an inner surface of an automotive vehicle roof having an opening is provided. The headliner assembly includes a dimensionally stable substrate having an upper surface facing the inner surface of the roof, and an opposite lower surface. The substrate is secured to the opening of the roof at an attachment point. A reinforcement member having a top surface and an opposite bottom surface fixedly secured to the top surface of the substrate. The reinforcement member is disposed adjacent the attachment point to provide additional rigidity to a region of the substrate surrounding the attachment point.

11 Claims, 5 Drawing Sheets

US 8,141,940 B2

HEADLINER ASSEMBLY HAVING A REINFORCEMENT MEMBER AND SUBCOMPONENT ROUTING AID

FIELD OF THE INVENTION

The invention relates to headliners for use in automotive vehicles. More particularly, the invention relates to a headliner having a reinforcement member which provides additional rigidity and routing for a subcomponent.

BACKGROUND OF THE INVENTION

Most modern automotive vehicles utilize a headliner to provide an aesthetically pleasing appearance to the passenger compartment of an automotive vehicle. The headliner is typically attached to an inner surface of the roof of the automotive vehicle by a number of attachments, or fasteners located at strategic attachment points. In addition to the aesthetically pleasing appearance, the headliner allows for the attachment of an assortment of components including interior lights, HVAC vents, handle bars, and various entertainment systems.

In order to increase the production efficiency during the installation of the headliner, the number of attachment points is reduced and a number of components are attached to the headliner prior to its installation into the automotive vehicle. As such, the load imposed on the region of the headliner adjacent each attachment point increases, and those regions become prone to failure. The headliner is subjected to cracks, tears, buckling, and other imperfections which result in damage to the headliner and often a new headliner is required to be installed. Production efficiency is severely decreased due to the increase in installation time of the headliner.

In addition, the headliner covers various subcomponents, illustratively including wiring harnesses and transport hosing, disposed along the roof of the automotive vehicle. During assembly, unsecured subcomponents often interfere with the attachment of the headliner thereby decreasing production efficiency. The unsecured subcomponents often block the attachment points, and as the headliner often spans the entire length of the automotive vehicle it is difficult for an assembly team member to reach around the headliner to move the subcomponent. Further, some subcomponents require specific routes when changing direction so as to avoid kinks, pinches, or radical bendings which would damage or impede the subcomponent.

Thus there exists a need for an improved headliner which provides additional rigidity to the regions adjacent the attachments and secures and routes subcomponents.

SUMMARY OF THE INVENTION

The present invention provides a headliner assembly which overcomes the above-mentioned disadvantages.

According to one aspect of the invention, a headliner assembly for covering an inner surface of an automotive vehicle roof having an opening is provided. The headliner assembly includes a dimensionally stable substrate having an upper surface facing the inner surface of the roof, and an opposite lower surface. The substrate is secured to the opening of the roof at an attachment point. A reinforcement member having a top surface and an opposite bottom surface fixedly secured to the top surface of the substrate. The reinforcement member is disposed adjacent the attachment point to provide additional rigidity to a region of the substrate surrounding the attachment point.

The reinforcement member, optionally, includes an arcuate leading edge to route a subcomponent along the reinforcement member. Further, the reinforcement member includes an attachment member to secure the subcomponent to the reinforcement member to restrain the subcomponent along the arcuate leading edge.

Advantages of the present invention will be readily appreciated as the same becomes better understood by reference to the following detailed description when considered in conjunction with the accompanying drawings.

DETAILED DESCRIPTION OF THE INVENTION

The present invention has utility as a headliner assembly for covering an inner surface of an automotive vehicle roof which overcomes the above-mentioned disadvantages. The headliner assembly provides additional rigidity to the region of the headliner adjacent the attachment point of the headliner assembly to the roof. Further, concerns regarding the subcomponents impeding the installation of the headliner assembly have been eliminated by securing the subcomponents along a predetermined route.

Figure 1:
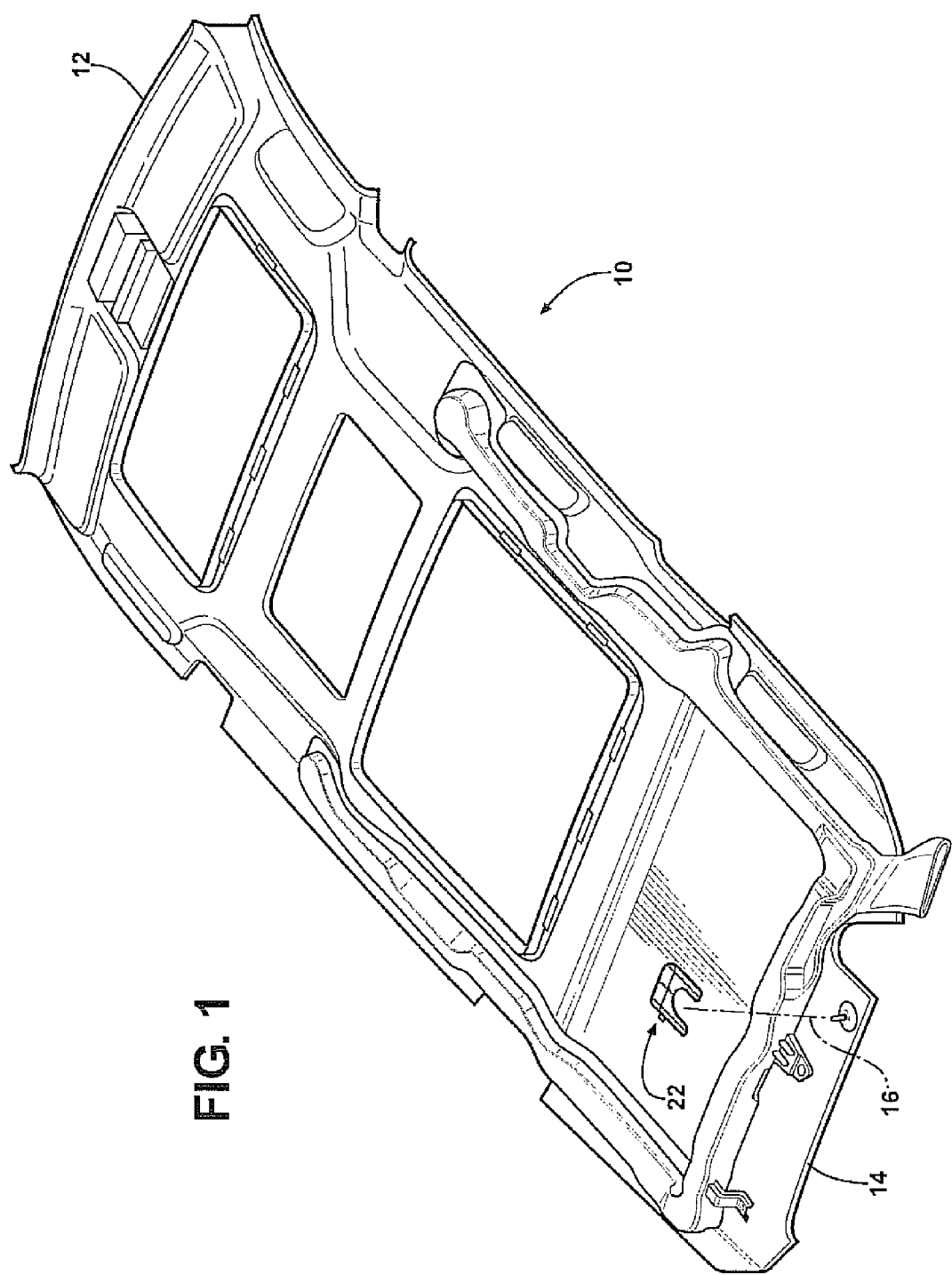
FIG. 1 is a top perspective view of the inventive headliner assembly.

Referring to FIG. 1, a headliner assembly is generally indicated at 10. The headliner assembly 10 is used to cover a roof of an automotive vehicle and provide an aesthetically pleasing appearance to a passenger compartment of the automotive vehicle. In addition, the headliner assembly 10 includes a front end 12 and a rear end 14 which correspond to the front end and the rear end of the automotive vehicle, respectively.

Figure 4:
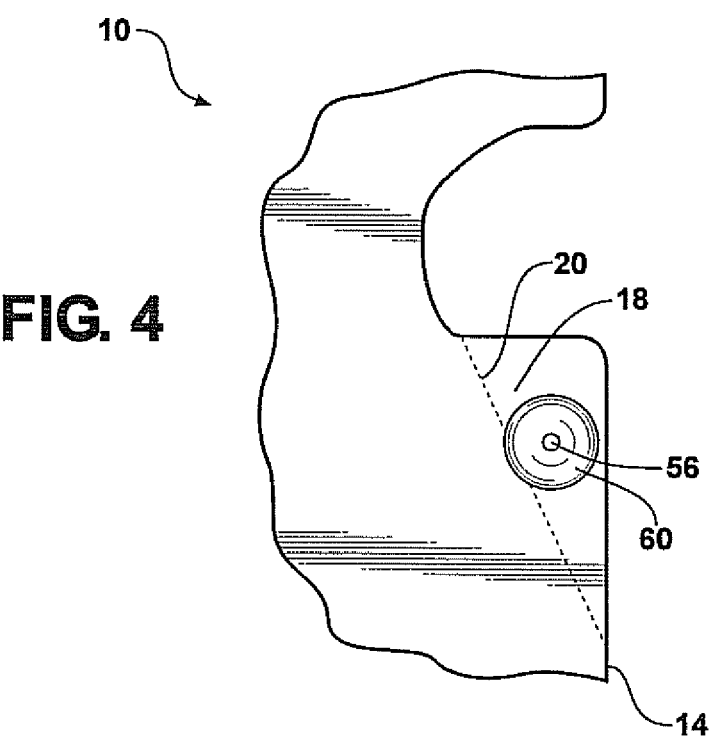
FIG. 4 is a top plane view of a headliner assembly without a reinforcement member.

During installation of the headliner assembly 10, an assembly team member attaches the front end 12 to the roof at a front attachment point (not shown) and then attaches the rear end 14 at a rear attachment point 16. As seen in FIG. 4, the region 18 adjacent/surrounding the attachment point 16 of the rear end 14 of the headliner assembly 10 is prone to failure. Specifically, the region 18 often develops cracks, tears, or other imperfections along fault line 20 which results in damage to the headliner assembly 10 thereby increasing overall costs and installation time.

Figure 2:
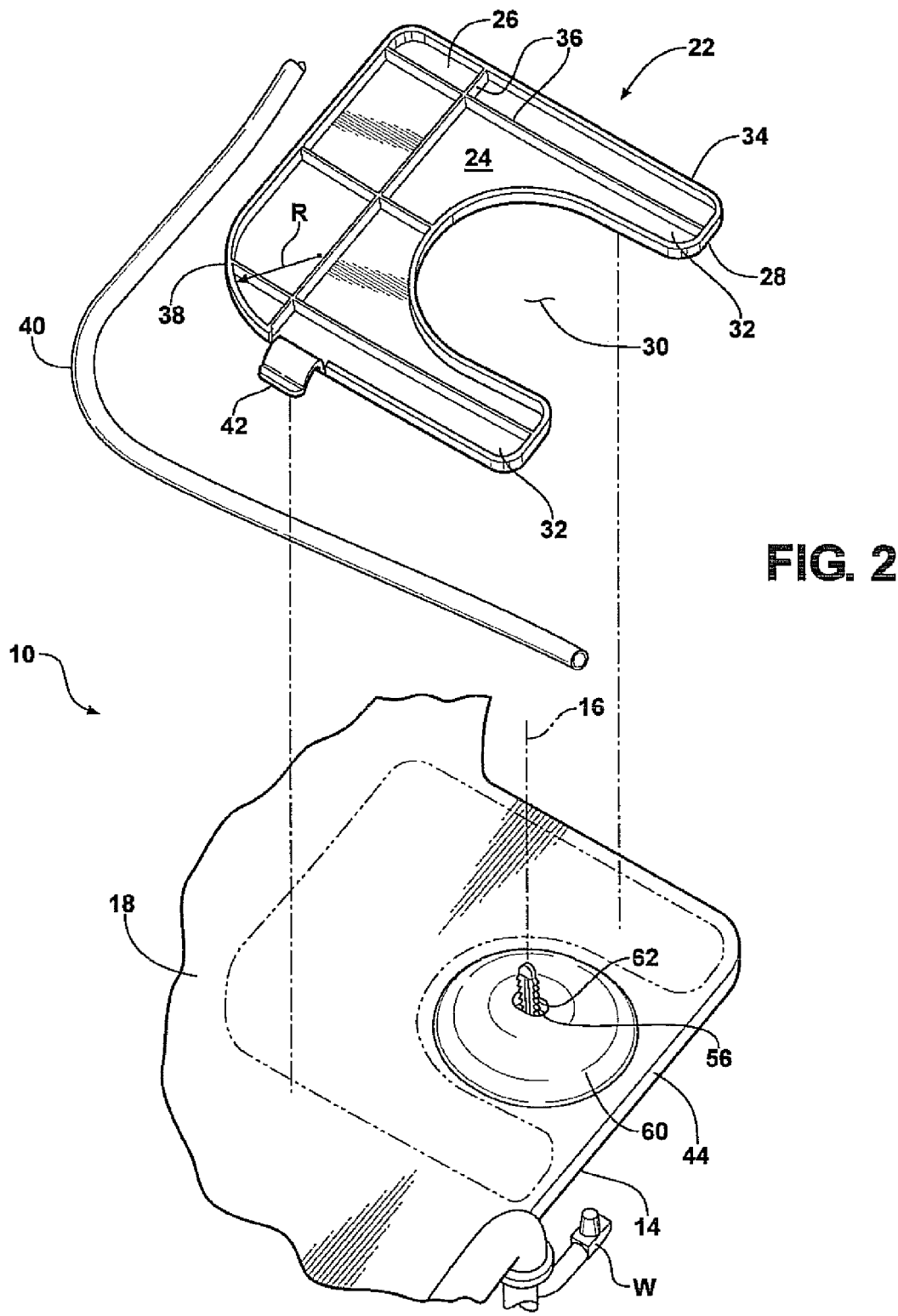
FIG. 2 is an exploded top perspective view of an embodiment of the present invention.
Figure 3:
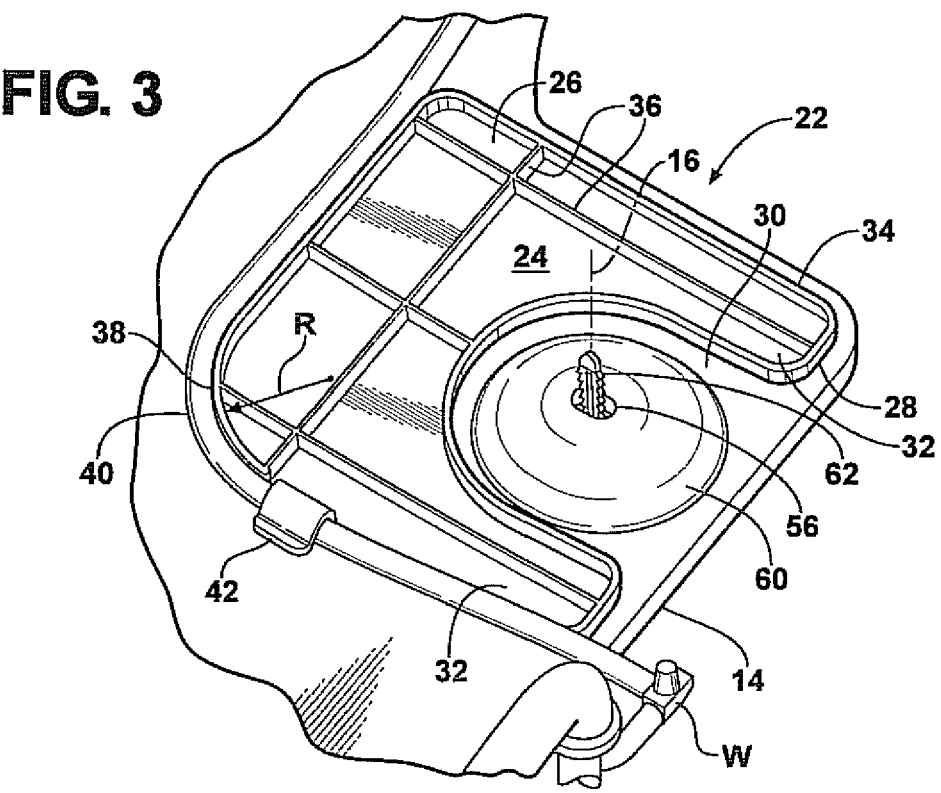
FIG. 3 is a top perspective view illustrating an embodiment of the present invention.

Referring to FIGS. 2 and 3, the inventive headliner assembly 10 includes a reinforcement member 22. The reinforcement member 22 has a body portion 24 which includes a top surface 26 and an opposite bottom surface 28. The reinforcement member 22 includes a pair of parallel of fingers 32 which define a recess 30 in the body portion 24. The recess 30, in conjunction with the pair of fingers 32 at least partially surrounds the attachment point 16, to provide additional rigidity to the region 18 surrounding the attachment point 16 so as to avoid the headliner assembly 10 from failing.

A ridge 34 extends outwardly from the top surface 26 of the reinforcement member 22. The ridge 34 bounds a perimeter of the body portion 24 of the reinforcement member 22. A plurality of ribs 36 extend between the ridge 34, along the upper surface 26 of the body portion 24, to provide rigidity to the reinforcement member 22.

The reinforcement member 22 includes an arcuate leading edge 38 used to route a subcomponent 40 along a predetermined route. The arcuate leading edge 38 has a radius R to define a curve for the subcomponent 40 to change direction without kinking or bending the subcomponent 40. In the illustrated embodiment the subcomponent 40 is a supply hose for a rear windshield wiper. The supply hose subcomponent 40, transfers window wiper fluid from a reservoir located in the engine compartment to a window wiper dispenser W located adjacent the rear end 14 of the headliner assembly 10. As the illustrated subcomponent 40 transfers a fluid, the arcuate leading edge 38 has a radius R which defines a curve that when the subcomponent is routed along, in abutting contact with the arcuate leading edge 38, the subcomponent 40 changes direction without impeding the flow of windshield wiper fluid through the subcomponent 40.

An attachment member 42 is attached to the reinforcement member 22 to secure the subcomponent 40 to the reinforcement member 22 so as to restrain the subcomponent 40 in a along the arcuate leading edge 38. The attachment member 42 is optionally formed as a molded snap-in tab positioned adjacent the arcuate leading edge 38.

Figure 5:
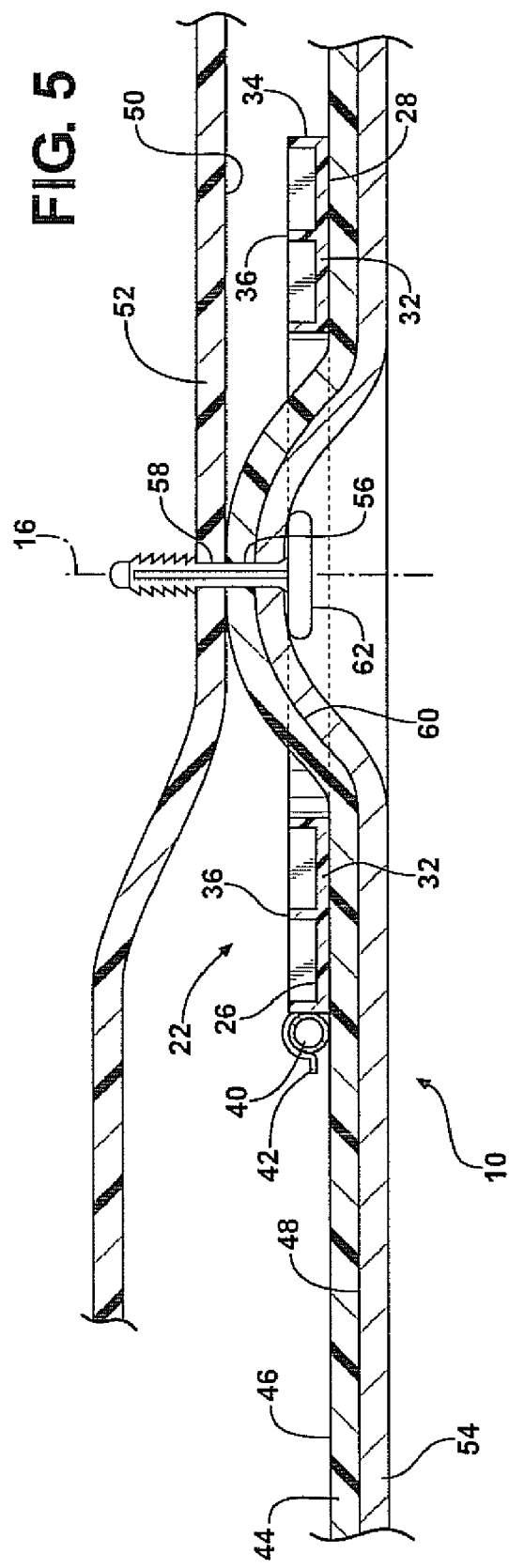
FIG. 5 is a partial cross-sectional view taken along line 5-5 of FIG. 3.

Referring to FIG. 5, the headliner assembly 10 includes a dimensionally stable substrate 44 having an upper surface 46, and an opposite lower surface 48. The upper surface 46 faces an inner surface 50 of the roof 52, and has the bottom surface 28 of the reinforcement member 22 fixedly secured thereto by an adhesive or any other means to attach one object to another. The substrate 44 defines the overall shape of the headliner assembly 10, and, therefore, the shape of the reinforcement member 22.

In the illustrated embodiments, the region 18 adjacent the attachment point 16 has a generally planar shape and, consequently, the body portion 24 of the reinforcement member 22 has a corresponding generally planar shape; however, the reinforcement member 22 is not limited to such a shape. It is appreciated, of course, that the body portion 24, and optionally the pair of fingers 32, of the reinforcement member 22 are formed having a shape which conforms to the contours of the substrate 44. The reinforcement member 22 and the substrate 44 have corresponding shapes, illustratively including concave, convex or even complex shapes, such that the reinforcement member 22 is firmly seated against the upper surface 46 of the substrate 44.

A headliner cover 54 is optionally attached to the lower surface 48 of the substrate 44 to provide the headliner assembly 10 with a soft padded feel and an aesthetically pleasing appearance to the passenger compartment of the automotive vehicle.

As seen in FIG. 5, the attachment point 16 is the center line of an aperture 56 formed in the substrate 44, extending from a lower surface 48 to an upper surface 46, and a corresponding opening 58 formed in the roof 52. The aperture 56 is surrounded by a shaped portion 60 formed integrally in the substrate 44. In the illustrated embodiment, the shaped portion 60 has a generally domed-shape. It will be appreciated, of course, that the shape of the shaped portion 60 is not limited to a dome shaped, and can include a variety of other shapes illustratively including a stepped rectangular or pyramid shape. Further, the shaped portion 60 optionally extends in a direction opposite the illustrated direction that is the shaped portion 60 extends away from the inner surface 46 of the roof 52.

As seen in FIGS. 2 and 4, the recess 30 of the reinforcement member 22 includes a curvature which corresponds to the shape of the shaped portion 60. In the illustrated embodiment, the shaped portion 60 has a generally domed shaped and the recess 30 has a corresponding C-shape. The corresponding shapes of the shaped portion 60 and the recess 30 allow the reinforcement member 22 to provide better rigidity to the region surrounding the attachment point 16.

Referring back to FIG. 5, a fastener 62 is used to attach the headliner assembly 10 to the roof 52 of the automotive vehicle at the attachment point 16. The fastener 62 extends through the headliner cover 54 and through the aperture 56 of the substrate 44 and into the opening 58 of the roof 52. The fastener 62 is optionally a releasable clip which snap fits or frictionally engages with the opening 58 or any other type of fastener known in the art to secure one object to another, illustratively including a screw, a bolt, or a projection for use in a heat stake process.

Figure 6:
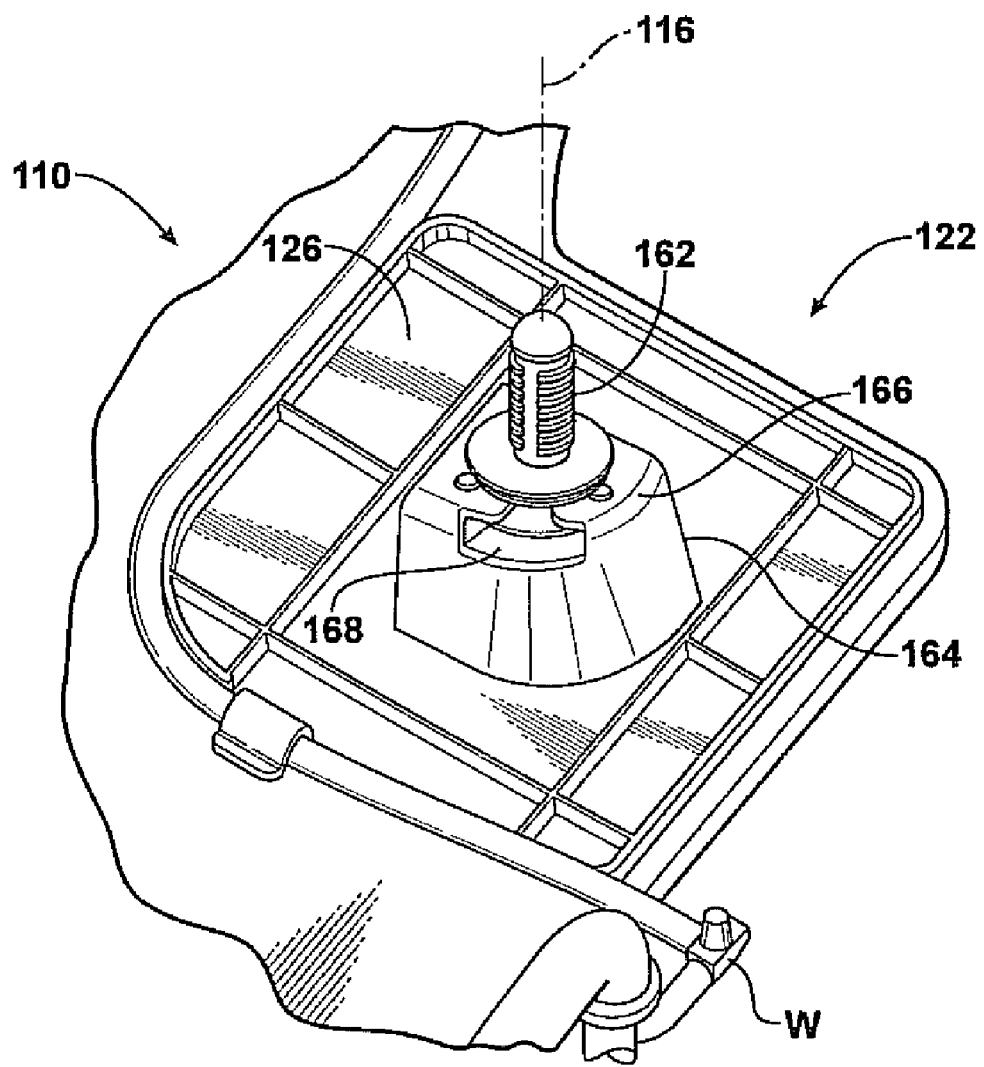
FIG. 6 is a top perspective view illustrating a second embodiment of the present invention.

Referencing FIG. 6, an alternative embodiment of the headliner assembly 110 is illustrated. A housing 164, referred to as a "doghouse," extends outwardly from the top surface 126 of the reinforcement member 122. The housing 164 includes an attachment wall 166 having a keyed opening 168 for receiving a fastener 162. In this embodiment, the attachment point 116 is the center line of the keyed aperture 168 and the opening formed in the roof. The remaining components of the headliner assembly 110 are identically to the above described headliner assembly 10.

The reinforcement member 122 is advantageous in that substrate does not require an opening or a shaped member. Further, the fastener 162 is not visible from the passenger compartment and the fastener 162 can be preinstalled into the housing 164 to prior to the attachment of the headliner assembly 110 to the automotive vehicle, thereby decreasing the installation time.

It is appreciated, of course, that although the reinforcement member is described in conjunction with a rear side of a headliner assembly, it is not limited to such a location and can be implemented at various other locations along the headliner assembly. Further, the inventive headliner assembly can be used in a variety of different environments, illustratively including boats, planes, and other structure utilizing a headliner assembly.

For the foregoing, it can be seen that the present invention provides a headliner assembly having a reinforcement member which provides additional rigidity to the region adjacent an attachment point of the headliner assembly to a structural support. Having described the invention, however, many modifications thereto will become apparent to those skilled in the art to which it pertains without deviation from the spirit of the invention as defined by the scope of the appended claims.

It is claimed:

1. A headliner assembly for covering an inner surface of an automotive vehicle roof having an opening, said headliner assembly comprising:

a headliner having an upper surface and an opposite lower surface, said upper surface facing the inner surface of the automotive vehicle roof, said headliner having an aperture centered in a dome shaped portion for receiving a fastener to secure the headliner to the opening in the roof at an attachment point; and a reinforcement member having a body portion and a pair of fingers, said body portion having a top surface and a bottom surface, said bottom surface fixedly secured to said upper surface of said headliner, said top surface spaced apart from the inner surface of the automotive vehicle roof, said pair of fingers defining a recess in said body portion so as to at least partially surround said dome shaped portion to provide additional rigidity to a region of said headliner surrounding said aperture.

2. The headliner assembly of claim 1, wherein said reinforcement member includes an arcuate leading edge to route a subcomponent along said reinforcement member.

3. The headliner assembly of claim 2, wherein said reinforcement member includes an attachment member to secure said subcomponent to said reinforcement member.

4. The headliner assembly of claim 1, wherein said recess has a curvature corresponding to said dome shaped portion.

5. A headliner assembly for covering an inner surface of an automotive vehicle roof having an opening, said headliner assembly comprising:
 a headliner having an upper surface and an opposite lower surface, said upper surface facing the inner surface of the automotive vehicle roof, said headliner secured to the opening of the roof at an attachment point; and
 a reinforcement member having a top surface and a bottom surface, said bottom surface fixedly secured to said upper surface of said headliner, said reinforcement member having a housing extending outwardly from said top surface, said attachment point is located on said housing, said reinforcement member being disposed adjacent said attachment point to provide additional rigidity to a region of said headliner surrounding said attachment point.

6. The headliner assembly of claim 3, wherein said attachment member is a molded snap-in clip.

7. A reinforcement member for a headliner assembly used for covering an inner surface of an automotive vehicle roof having an opening, the headliner assembly including a headliner and a fastener, the headliner having an upper surface facing the inner surface of the roof of the automotive vehicle, an opposite lower surface, and an aperture centered in a dome shaped portion for receiving the fastener to secure the headliner to the opening in the roof, said reinforcement member comprising:
 a body portion having a top surface and an opposite bottom surface, said bottom surface fixedly secured to the upper surface of the headliner, said top surface spaced apart from the inner surface of the automotive vehicle roof; and
 a pair of fingers defining a recess in said body portion so as to at least partially surround the dome shaped portion to provide additional rigidity to a region of the headliner adjacent the aperture.

8. The reinforcement member of claim 7, wherein said recess has a curvature corresponding to the dome shaped portion.

9. The reinforcement member of claim 7, wherein said reinforcement member includes an arcuate leading edge to route a subcomponent along said reinforcement member.

10. The reinforcement member of claim 9, wherein said reinforcement member includes an attachment member to secure said subcomponent to said reinforcement member.

11. The reinforcement member of claim 10, wherein said attachment member is a molded snap-in clip.

* * * * *